(12) United States Patent
Kleine-Hartlage et al.

(10) Patent No.: US 11,555,514 B2
(45) Date of Patent: Jan. 17, 2023

(54) ATTACHMENT UNIT

(71) Applicant: Amazonen-Werke H. Dreyer GmbH & Co. KG, Hasbergen (DE)

(72) Inventors: Hubertus Kleine-Hartlage, Bad Iburg (DE); Ulrich Krabbe, Hasbergen (DE); Rainer Hofter, Bissendorf (DE)

(73) Assignee: Amazonen-Werke H. Dreyer SE & Co. KG

( * ) Notice: Subject to any disclaimer, the term of this patent is extended or adjusted under 35 U.S.C. 154(b) by 340 days.

(21) Appl. No.: 16/639,903

(22) PCT Filed: Aug. 16, 2018

(86) PCT No.: PCT/EP2018/072170
§ 371 (c)(1),
(2) Date: Feb. 18, 2020

(87) PCT Pub. No.: WO2019/038163
PCT Pub. Date: Feb. 28, 2019

(65) Prior Publication Data
US 2021/0131476 A1    May 6, 2021

(30) Foreign Application Priority Data
Aug. 21, 2017  (DE) .................... 10 2017 119 010.4

(51) Int. Cl.
*F16B 37/04* (2006.01)

(52) U.S. Cl.
CPC .......... *F16B 37/043* (2013.01); *F16B 37/042* (2013.01); *F16B 37/04* (2013.01)

(58) Field of Classification Search
CPC .... F16B 37/041; F16B 37/042; F16B 37/043; F16B 37/045; F16B 37/122; F16B 37/04;
(Continued)

(56) References Cited

U.S. PATENT DOCUMENTS 5,195,857 A * 3/1993 Hiramoto .............. F16B 21/086
411/173
8,297,169 B2 10/2012 Kunda
(Continued)

FOREIGN PATENT DOCUMENTS

DE    199 44 685 A1    3/2001
DE    102006007244 A1  8/2007
(Continued)

OTHER PUBLICATIONS

International Search Report dated Dec. 4, 2018 in corresponding PCT Patent Application No. PCT/EP2018/072170.
(Continued)

*Primary Examiner* — Roberta S Delisle
(74) *Attorney, Agent, or Firm* — Mintz, Levin, Cohn, Ferris, Glovsky and Popeo, P.C.

(57) ABSTRACT

An attachment unit for providing a mounting thread as an internal thread on a component, in particular on a thin-walled component, includes an attachment body that bears the mounting thread and is arranged on a first side of the component in a region of a recess extending through the component, and a holding element that is arranged on a second side of the component in the region of the recess extending through the component and disposed opposite to the attachment body so as to hold the attachment body on the first side of the component.

15 Claims, 8 Drawing Sheets

(58) Field of Classification Search
CPC . Y10S 411/97; Y10S 411/967; Y10S 411/968
USPC .......................... 411/172–174, 178, 182, 183
See application file for complete search history.

(56) References Cited

U.S. PATENT DOCUMENTS

| | | | | |
|---|---|---|---|---|
| 8,579,570 | B2* | 11/2013 | Fellows | .............. F16B 37/0842 |
| | | | | 411/177 |
| 9,033,632 | B2* | 5/2015 | Komsitsky | ............ F16B 5/0208 |
| | | | | 411/182 |
| 2005/0053449 | A1* | 3/2005 | Grubert | ................... F16B 5/025 |
| | | | | 411/546 |
| 2009/0052151 | A1* | 2/2009 | Hung | .................... F16B 21/186 |
| | | | | 361/809 |
| 2013/0078052 | A1 | 3/2013 | Degner et al. | |
| 2021/0140456 | A1* | 5/2021 | Zimmermann | .......... B62J 15/02 |

FOREIGN PATENT DOCUMENTS

| | | |
|---|---|---|
| EP | 1 281 876 A1 | 2/2003 |
| EP | 2647852 A2 | 10/2013 |
| EP | 2684437 A1 | 1/2014 |

OTHER PUBLICATIONS

Intention to Grant issued in European Application No. 18758853.8, dated May 30, 2022, 37 pages. (only official copy).

\* cited by examiner

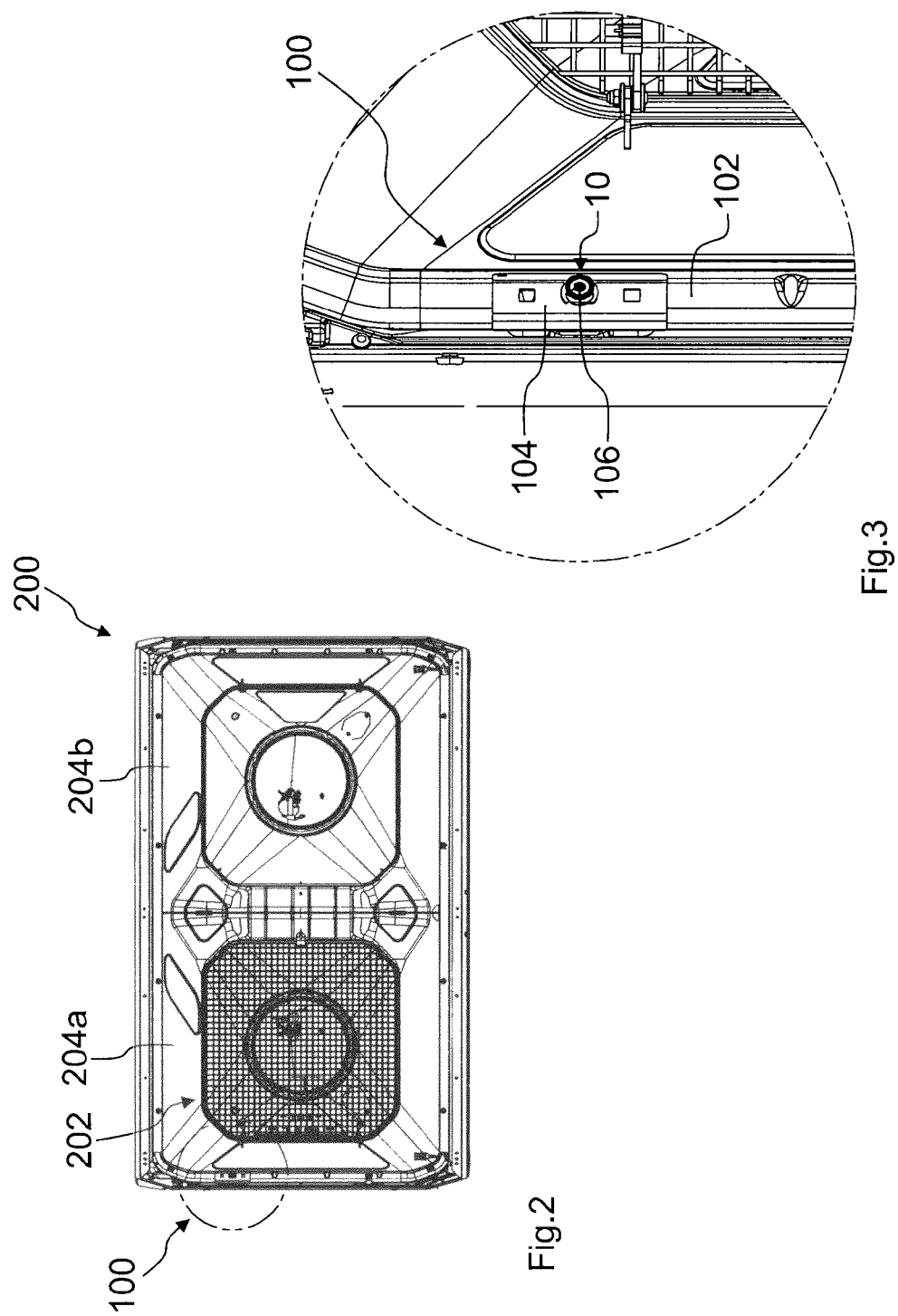

ATTACHMENT UNIT

The invention relates to an attachment unit for the provision of a mounting thread formed as an internal thread on a component, in particular on a thin-walled component.

In a variety of applications, it is necessary to connect or attach two different components to each other. The problem is often that no mounting thread can be easily introduced into one of the components.

In particular with thin-walled components, the material thickness is typically insufficient to provide a robust mounting thread directly on the component. In addition to the thin-walled nature of components, there are a number of other obstacles that prohibit the introduction of mounting threads on components. The introduction of mounting threads into components, for example, can damage the coating of the respective component. Furthermore, limited accessibility of a component portion can lead to the direct introduction of a mounting thread not being possible at all or only with great effort.

For the provision of a mounting thread, it is known from prior art to provide the respective components with recesses and to drive rivet nuts by impact into the recesses. Publication EP 2 684 437 A1 proposes a respective attachment method for components of an agricultural distribution machine. However, driving in the rivet nuts in by impact typically leads to damage to the component coating, thus increasing the corrosion susceptibility of the component and reducing the service life.

In addition, it is known to use washers with a paint-friendly coating to prevent damage to the component coating during the assembly process. A corresponding washer is known, for example, from publication EP 2 647 852 A2.

The known solutions for the provision of an assembly wound on a component involve a high risk of component damage or require time-consuming and costly assembly processes.

The object underlying the invention is therefore to enable the provision of a mounting thread on a component without this leading to component damage and/or requiring time-consuming or costly assembly operations.

The object is satisfied by an attachment unit of the kind mentioned above, where the holding element comprises one or several connecting parts which for holding the attachment body on the first side of the component are adapted to be attached to a holding portion of the attachment body that is spaced from the mounting thread.

The invention makes use of the finding that, using an at least two-part attachment unit, which comprises an attachment body bearing the mounting thread and a holding element formed to hold the attachment body, overcomes the need to drive the attachment body into the component by impact like a rivet nut. The attachment unit can therefore be attached to the component without any substantial material stress, unlike a rivet nut. In doing so, the attachment unit provides a mounting thread on the component in the same manner as a rivet nut and can be used to attach a further component to the component on which the mounting thread was provided. The provision of a mounting thread on the component is therefore effected without or with a significantly lower risk of damage to a coating of the component, such as a coat of paint. Accelerated aging and an increased risk of component failure due to corrosion is then effectively prevented. In addition, the attachment unit according to the invention allows for single person assembly, so that the assembly effort is significantly reduced.

In a particularly preferred embodiment of the attachment unit according to the invention, the one or the several connecting part/s of the holding element is/are adapted to be connected to the holding portion of the attachment body in a reversibly detachable and preferably in a non-destructive and/or toolless manner. The attachment unit can be detached from the component due to the reversibly detachable nature of the connection between the one or the several connecting parts of the holding element and the holding portion of the attachment body. For example, replacement of the attachment unit is then possible without damaging the component during the replacement process. It is thereby avoided that the entire component to which the attachment unit is connected must be replaced, in particular in the event of damage to the attachment unit.

In addition, an attachment unit according to the invention is preferred in which the one or the several connecting parts of the holding element are adapted to be connected at least in a positive-fit manner to the holding portion of the attachment body. Alternatively or in addition, the one or the several connecting part/s of the holding element is/are adapted to be connected in a force-fit manner to the holding portion of the attachment body. The force-fit connection can be, for example, a clamp connection.

In another embodiment of the attachment unit according to the invention, the one or the several connecting part/s comprise/s one or several elastically deformable webs which for holding the attachment body on the first side of the component are adapted to be connected subject to elastic deformation to the holding portion of the attachment body that is spaced from the mounting thread.

The one or the several elastically deformable web/s is/are preferably adapted to be elastically deformed by contacting the attachment body when inserting the holding element into the attachment body. The positive-fit connection between the one or the several elastically deformable webs and the holding portion of the attachment body is preferably effected in that the one or the several elastically deformed webs each assume a positive-fit position due to a restoring force.

In addition, an attachment unit according to the invention is preferred in which the holding portion of the attachment body comprises one or several engagement edges and the one or the several webs are each formed as an engagement hook, where the one or the several engagement edges and the one or the several engagement hook/s is/are adapted to be locked to each other in order to hold attachment body on the first side of the component. Due to the one or the several engagement edges and the one or the several webs formed as engagement hooks, the attachment body and the holding element can be connected to each other in the manner of a clip connection. After locking the one or the several engagement edges and the one or the several engagement hooks, the attachment unit can either be already fully assembled or be in an intermediate state in which the attachment unit is not yet fully mounted. In the intermediate state, the attachment unit can, for example, have play which allows for a relative motion of the attachment unit relative to the component.

In a further preferred embodiment of the attachment unit according to the invention, the holding portion of the attachment body comprises a fixation thread formed as an internal thread and the one or the several engagement edges are part of the fixation thread. Preferably, the one or the several engagement edge/s is/are formed by the flanks of the thread turn of the fixation thread. The one or the several engagement hook/s is/are adapted to be locked in the thread turn of the fixation thread. By the use of the fixation thread for locking the one or the several engagement hooks, several locking positions of the holding element in the attachment body arise.

In addition, an attachment unit according to the invention is preferred in which the one or the several webs each comprise a contact region which bears a section of an external thread that corresponds to the fixation thread Die to the external thread in the contact region of the one or the several webs, the holding element can be further screwed in after the locking operation, which is made possible by the elastic deformability of the webs, so that a contact portion of the holding element comes into contact with a contact surface of the component which is arranged on the second side of the component. Any possible play between the attachment body and the holding element after the insertion of the holding element into the attachment body can be eliminated by additionally screwing the holding element into the attachment body. It can be ensured in this manner that the holding element can be inserted independently of the formation of the fixation thread all the way to a final position into the attachment body, where the holding element in the final position abuts against the component.

In a further preferred embodiment of the attachment unit according to the invention, a connecting part of the holding element is formed as a connecting thread formed as a circumferential and as an external thread, where the holding portion of the attachment body comprises a fixation thread formed as an internal thread and corresponding to the connecting thread. Unlike with the formation of the connecting parts as elastically deformable webs, the holding element in this case is not inserted axially into the attachment body, but screwed into the attachment body by way of a rotational motion. In this way, the stability and precision of the connection between the attachment body and the holding element can be further increased.

In a further advantageous development of the attachment unit according to the invention, the mounting thread and the fixation thread have different diameters. The fixation thread preferably has a larger diameter than the mounting thread. In this case, the one or the several connecting parts can be made to engage with the fixation thread without the one or the several connecting parts protruding into a region in which an attachment element to be screwed into the mounting thread, such as a screw, is to be inserted.

Furthermore, an attachment unit according to the invention is preferred in which the attachment body comprises an antirotation lock which is adapted to extend at least in sections through the recess in the component and due to a positive-fit connection prevent the rotation of the attachment body about a longitudinal axis of the attachment body. The recess of the component preferably comprises an inner contour with one or several corners or edges, where the antirotation lock is formed as a material projection whose shape or cross-section allows the insertion of the component into the recess in a rotationally locked manner. The recess of the component and/or the antirotation lock preferably have a rectangular or square cross-section.

In addition, an attachment unit according to the invention is advantageous in which the attachment body comprises a contact surface which is adapted to be in contact with a contact surface of the component arranged on the first side of the component. The contact surface of the attachment body in this case is used as a stop with which the attachment body can be positioned at least in one direction relative to the component.

In a further preferred embodiment of the attachment unit according to the invention, the holding element comprises a contact portion which is adapted to serve as a washer and/or spacer between the component and a further component to be attached to the component by use of the attachment unit. The contact portion of the holding element preferably comprises a circumferential ring-shaped outer surface. It can be prevented with the contact portion of the holding element that the two components to be attached to each other come into contact with each other. Furthermore, the spacing between the components to be attached to each other can be precisely adjusted by the material thickness of the contact portion.

In addition, an attachment unit according to the invention is preferred in which the contact portion of the holding element comprises a first contact surface which is adapted to be in contact with a contact surface of the component arranged on the second side of the component and/or a second contact surface which is adapted to be in contact with a contact surface of the further component to be attached to the component using the attachment unit. The first contact surface and the second contact surface extend preferably substantially in parallel and/or have a matching basic shape. The contact portion of the holding element preferably has a cross-section which extends over the cross-section of the recess of the component in sections or on all sides.

In a further development of the attachment unit according to the invention, the contact portion is formed to be round and/or disk-shaped and/or comprises one or several recesses. The number of recesses of the contact portion of the holding element preferably matches the number of elastically deformable webs of the holding element.

Furthermore, an attachment unit according to the invention is preferred in which the attachment body and/or the holding element are each formed integrally. Due to the integral formation of the attachment body and/or the holding element, the attachment unit is particularly robust against external influences, where the integral formation of the attachment body and/or the holding element can also have a significant influence on the strength of the connection between the attachment body and the holding element.

In a further advantageous development of the attachment unit according to the invention, the attachment body and/or the holding element are each in part or entirely formed form plastic material, in particular from fiber-reinforced plastic material. The fibers are preferably oriented in such a way that they form a fabric, a laid scrim, an embroidery or a braid. Alternatively, the fibers can also be oriented in the radial direction, in the axial direction, and/or in the circumferential direction. Alternatively or in addition, the attachment body and/or the holding element can also be in part or entirely formed from metal or a metal alloy.

The object underlying the invention is further satisfied by an assembly of the kind mentioned above, where the attachment unit is formed according to one of the embodiments described above. With regard to the advantages and modifications of the assembly according to the invention, the advantages and modifications of the attachment unit according to the invention are first made reference to.

In a particularly preferred embodiment of the assembly according to the invention, the attachment element is adapted to prevent the one or the several connecting parts from loosening from the holding portion of the attachment body already prior to being screwed in and/or while being screwed into the mounting thread. The attachment element is preferably formed as a screw. The flanks of the external thread of the screws there abut against the one or the several connecting parts of the holding element already prior to being screwed in and/or while being screwed into the mounting thread, so that an elastic deformation, which would allow the one or the several connecting parts to loosen from the holding portion of the attachment body, is prevented by the attachment element, because the attachment element takes up the space for the elastic deformation of the one or the several connecting parts.

Further details of the invention can be gathered from the description of the figures and the drawings, where FIG. 1 shows an agricultural distribution device in which the assembly according to the invention is installed;

FIG. 2 shows in a top view the agricultural distribution device shown in the FIG. 1;

FIG. 3 shows a section of the agricultural distribution device illustrated in FIG. 1 containing the assembly according to the invention;

Figure 1:
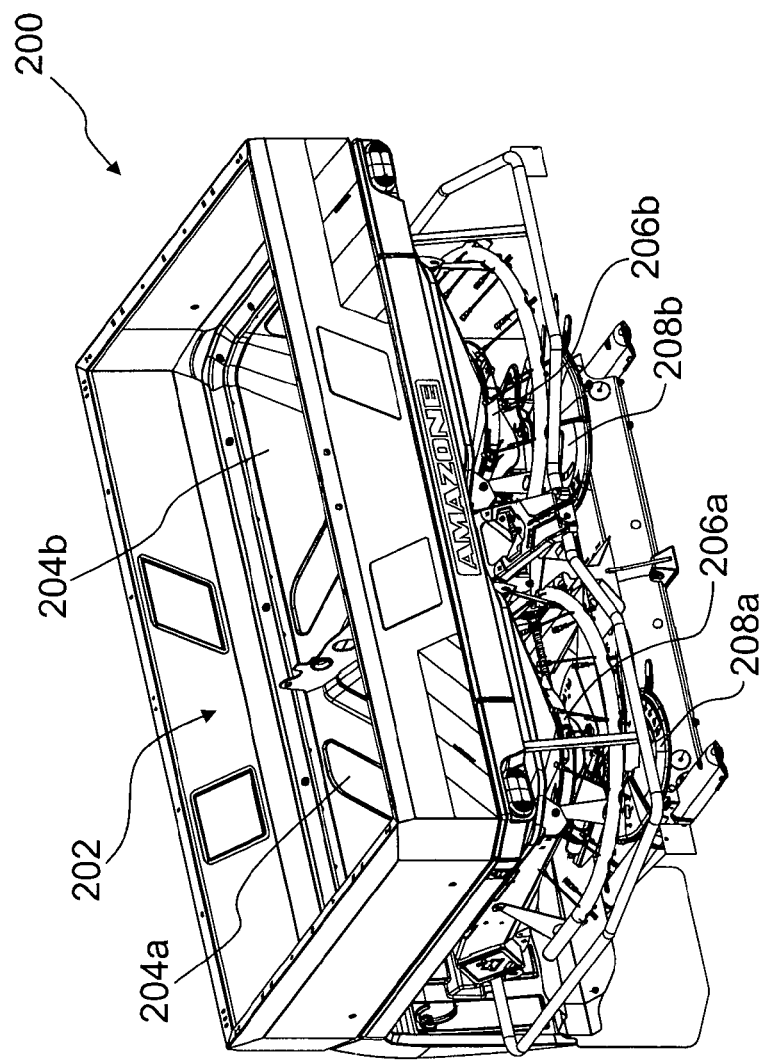

FIG. 1 shows an agricultural distribution device 200 formed as a fertilizer spreader. Distribution device 200 comprises a storage container 202 for storing scattering material, namely fertilizer. Storage container 202 comprises two storage regions 204a, 204b, where first storage region 204a is connected to dosing device 206a and second storage region 204b to dosing device 206b. Dosing devices 206a, 206b of the agricultural distribution device 200 are adapted to dispense a metered amount of scattering material onto the centrifugal discs 208a, 208 arranged beneath dosing devices 206a, 206b.

Storage container 202 is respectively formed in storage regions 204a, 204b from thin-walled deep-drawn sheet metal. The sheets of metal are attached to an equally thin-walled support frame. Furthermore, the sheets of metal and the support frame comprise a coating that protects the components from corrosion.

Due to the thin-walled nature of the sheets of metal and the support frame and their coating, it is not possible to introduce a load-bearing mounting thread directly into one of the components. Driving a rivet nut in by impact is out of the question due to the risk of damaging the coating.

FIG. 2 and FIG. 3 show that the sheet metal is formed as a first component 102 and the support frame as a second component 104 of an assembly 100. The assembly comprises an attachment unit 10 which provides a mounting thread 36 formed as an internal thread on first component 102. In addition, assembly 100 comprises an attachment element 106 formed as a screw. Attachment element 106 comprises an external thread 118 corresponding to mounting thread 36. First component 102 and second component 104 are attached to each other by way of attachment unit 10 and attachment element 106.

Figure 4:
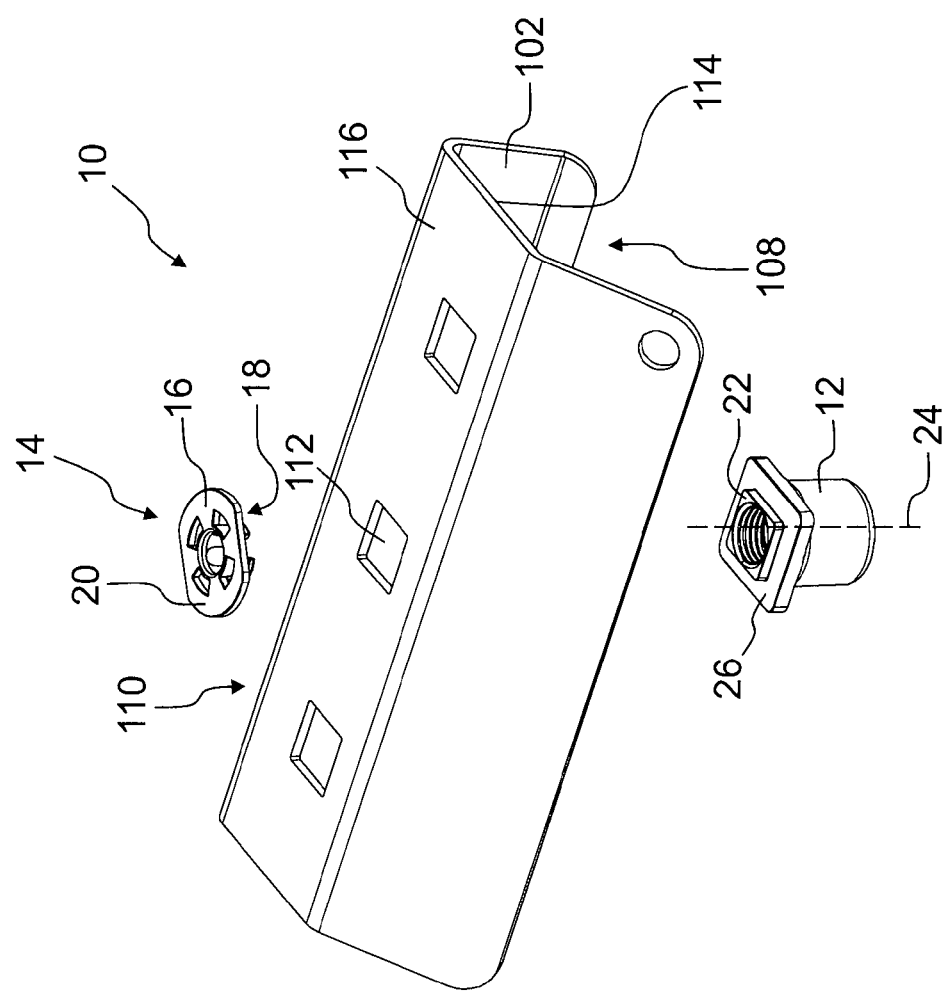
FIG. 4 shows an embodiment of the attachment unit according to the invention in a perspective view.

FIG. 4 shows an attachment unit 10 which is used to provide a mounting thread 36 formed as an internal thread on a thin-walled component 102. Attachment unit 10 comprises an attachment body 12 and a holding element 14.

Attachment body 12 bears mounting thread 36 and is arranged on a first side 108 of component 102 in the region of a recess 112 extending through component 102. For this purpose, the attachment body comprises a contact surface 26 and an antirotation lock 22. Contact surface 26 is adapted to be in contact with a contact surface 114 of component 102 arranged on first side 108 of component 102. Antirotation lock 22 can be inserted into recess 112 in component 102 and by way of a positive-fit connection prevents rotation of attachment body 12 about its longitudinal axis 24. Recess 112 of component 102 comprises an inner contour with several edges, where antirotation lock 22 is formed as material projection 28, whose shape has corresponding corners 30a-30d which allow for the insertion into recess 112 of component 102 in a rotationally locked manner (see also FIG. 5). Recess 112 of component 102 and antirotation lock 22 have a substantially square cross-section.

Holding element 14 is adapted to be arranged on a second side 110 of component 102 in the region of recess 112 extending through component 102 and disposed opposite to attachment body 12 and to hold attachment body 12 on first side 108 of component 102. Holding element 14 also comprises a contact portion 16 which is used as a washer and spacer between component 102 and a further component 104 to be attached to component 102 using attachment unit 10. Contact portion 16 of holding element 14 comprises a first contact surface 18 which is adapted to be in contact with a contact surface 116 of component 102 arranged on second side 110 of component 102. In addition, contact portion 16 of holding element 14 comprises a second contact surface 20 which is adapted to be in contact with a contact surface 120 of further component 104 to be attached to component 102 using attachment unit 10) (see also FIGS. 11 to 13). Furthermore, contact portion 16 is formed to be round and disk-shaped.

A mounting thread 36 is provided on component 102 by attachment unit 10 and can be used to attach a further component 104 to component 102 on which mounting thread 36 was provided.

Figure 5:
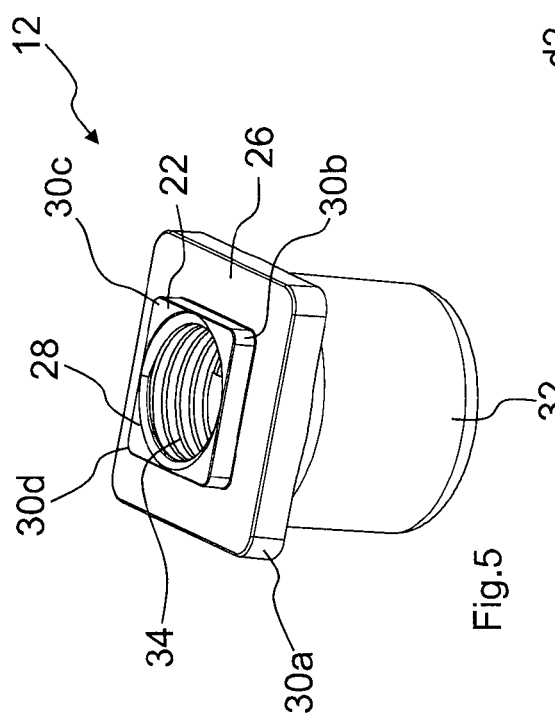
FIG. 5 shows an attachment body of an attachment unit according to the invention in a perspective view.
Figure 7:
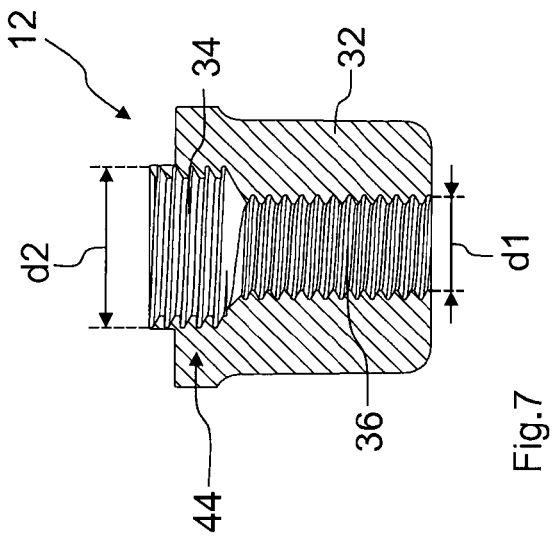
FIG. 7 shows in a sectional view the attachment body illustrated in FIG. 5.
Figure 6:
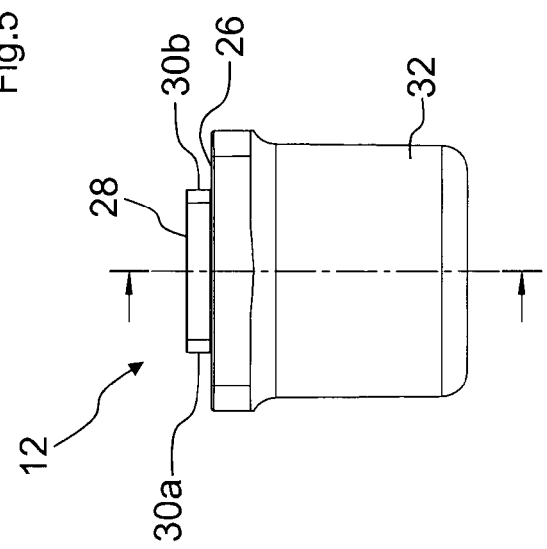
FIG. 6 shows in a side view the attachment body illustrated in FIG. 5.

FIGS. 5 to 7 show an integrally formed attachment body 12 made of plastic material which bears a mounting thread 36 and is adapted to be arranged on a first side 108 of a component 102 in the region of a recess 112 extending through component 102. In addition to mounting thread 36, attachment body 12 comprises a holding portion 44 which is spaced from mounting thread 36.

Holding portion 44 of attachment body 12 comprises a fixation thread 34 formed as an internal thread. The flanks of fixation thread 34 serve as engagement edges for elastically deformable webs of a holding element 14 formed as an engagement hook. Mounting thread 36 and fixation thread 34 have different diameters d1, d2, where diameter d2 of fixation thread 34 is larger than diameter d1 of mounting thread 36. Mounting thread 36 and fixation thread 34 are inserted into a base body 32 of attachment body 12.

Figure 8:
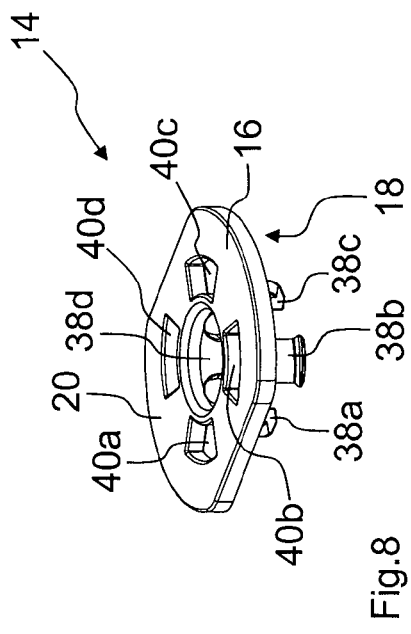
FIG. 8 shows a holding element of an attachment unit according to the invention in a perspective view.
Figure 10:
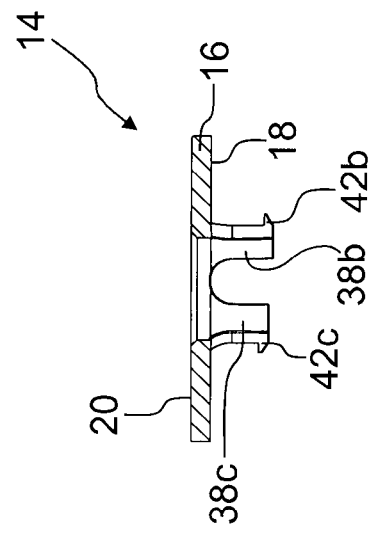
FIG. 10 shows in a sectional view the holding element illustrated in FIG. 8.
Figure 9:
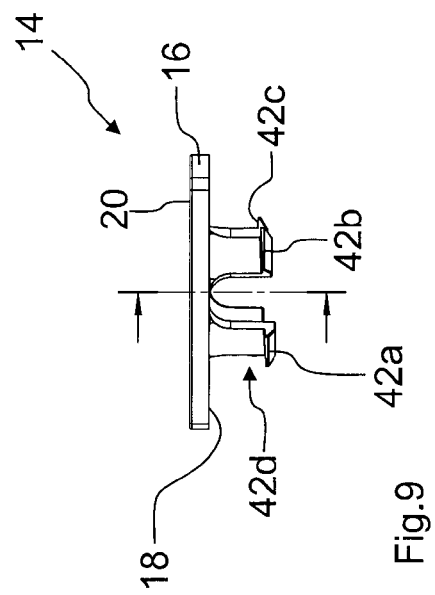
FIG. 9 shows in a side view the holding element illustrated in FIG. 8.

FIGS. 8 to 10 show an integrally formed holding element 14 made of plastic material. Holding element 14 is adapted to be arranged on a second side 110 of a component 102 in the region of a recess 112 extending through component 102 and disposed opposite to attachment body 12. Holding element 14 is employed to hold attachment body 12 on first side 108 of component 102. Holding element 14 comprises a total of four connecting parts 38a-38d, where two connecting parts 38a-38d are each arranged oppositely disposed. Connecting parts 38a-38d are formed as elastically deformable webs, where the elastically deformable webs for holding attachment body 12 on first side 108 of component 102 are adapted to be connected subject to elastic deformation to holding portion 44 of attachment body 12 spaced from mounting thread 36.

Connecting parts 38a-38d of holding element 14, formed as elastically deformable webs are connectable to holding portion 44 of attachment body 12 in a reversibly detachable and preferably in a non-destructive and toolless manner. For this purpose, connecting parts 38a-38d formed as elastically deformable webs are each formed as engagement hooks which are adapted to be locked with fixation thread 36 of attachment body 12 in the manner of a clip connection. Connecting parts 38a-38d formed as elastically deformable webs each comprise a contact region 42a-42d which bears a section of an external thread corresponding to fixation thread 34. Due to the external thread in contact region 42a-42d of the webs, holding element 14 can be further screwed in after the locking operation, which is made possible by the elastic deformability of the webs.

In addition, holding element 14 comprises a disk-shaped contact portion 16 which serves as a washer. Furthermore, contact portion 16 comprises several recesses 40a-40d, where the number of recesses 40a-40d of contact portion 16 of holding element 14 corresponds to the number of webs of holding element 14.

Figure 11:
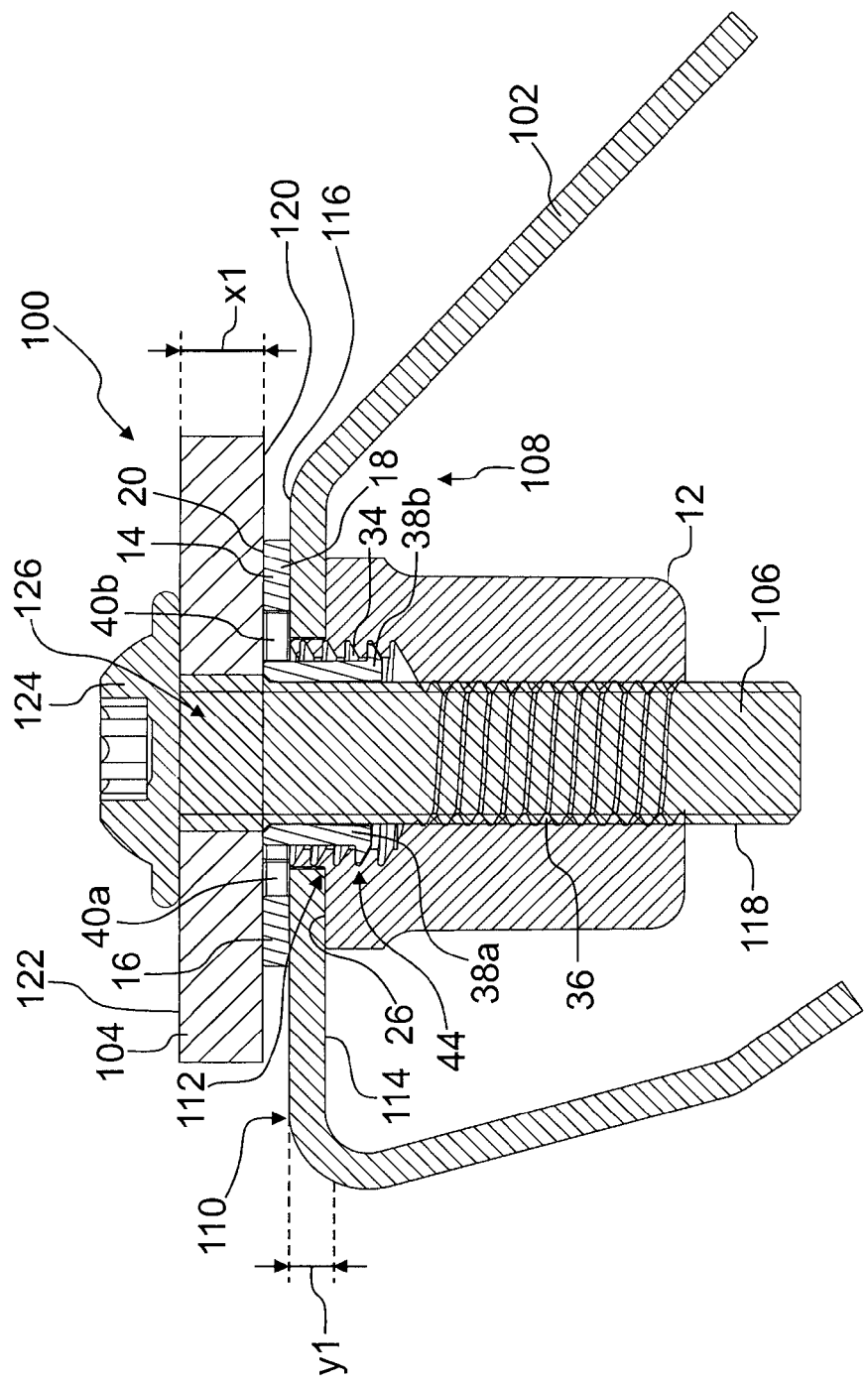
FIG. 11 shows an embodiment of the assembly according to the invention in a sectional view.
Figure 12:
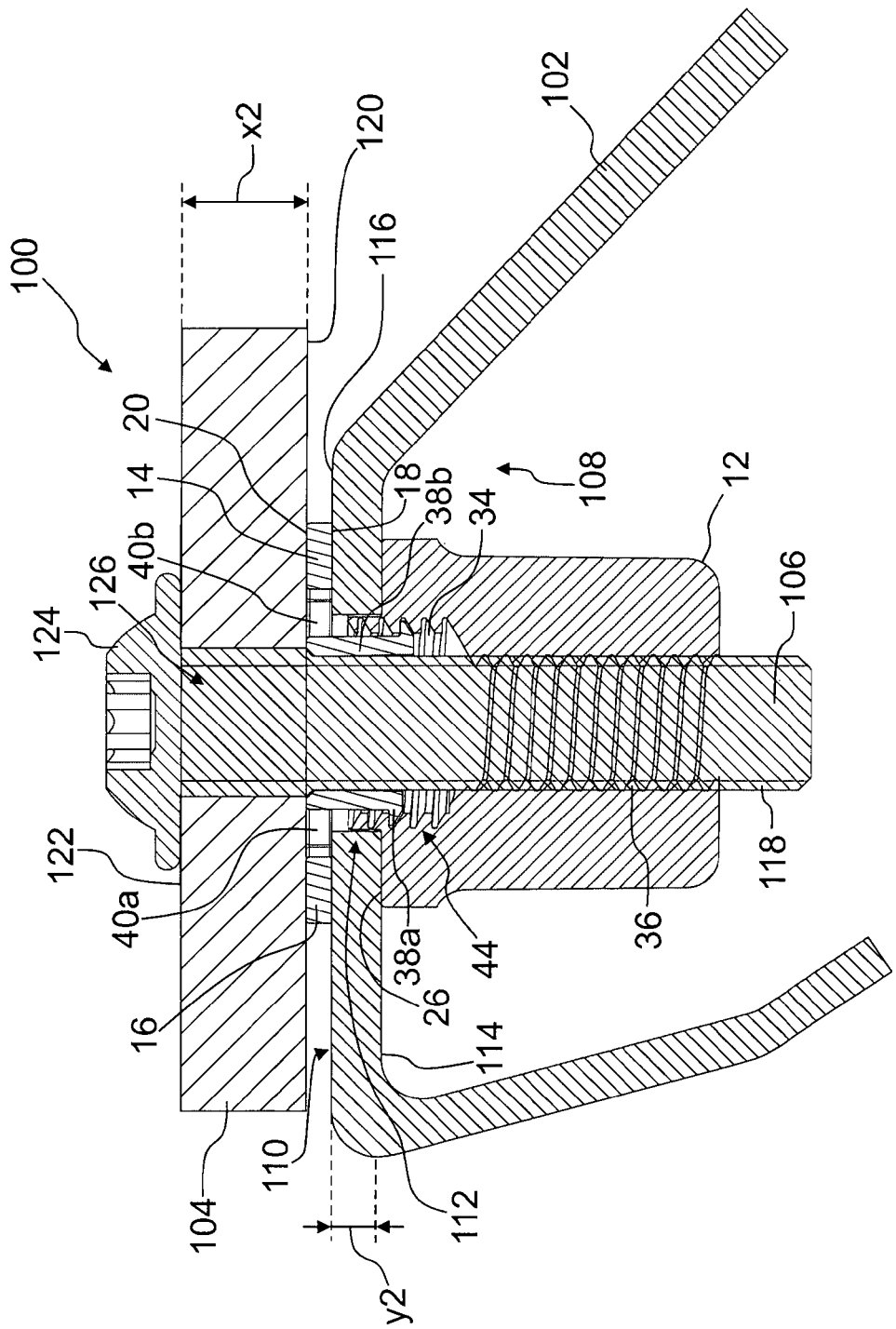
FIG. 12 shows a further embodiment of the assembly according to the invention in a sectional view.
Figure 13:
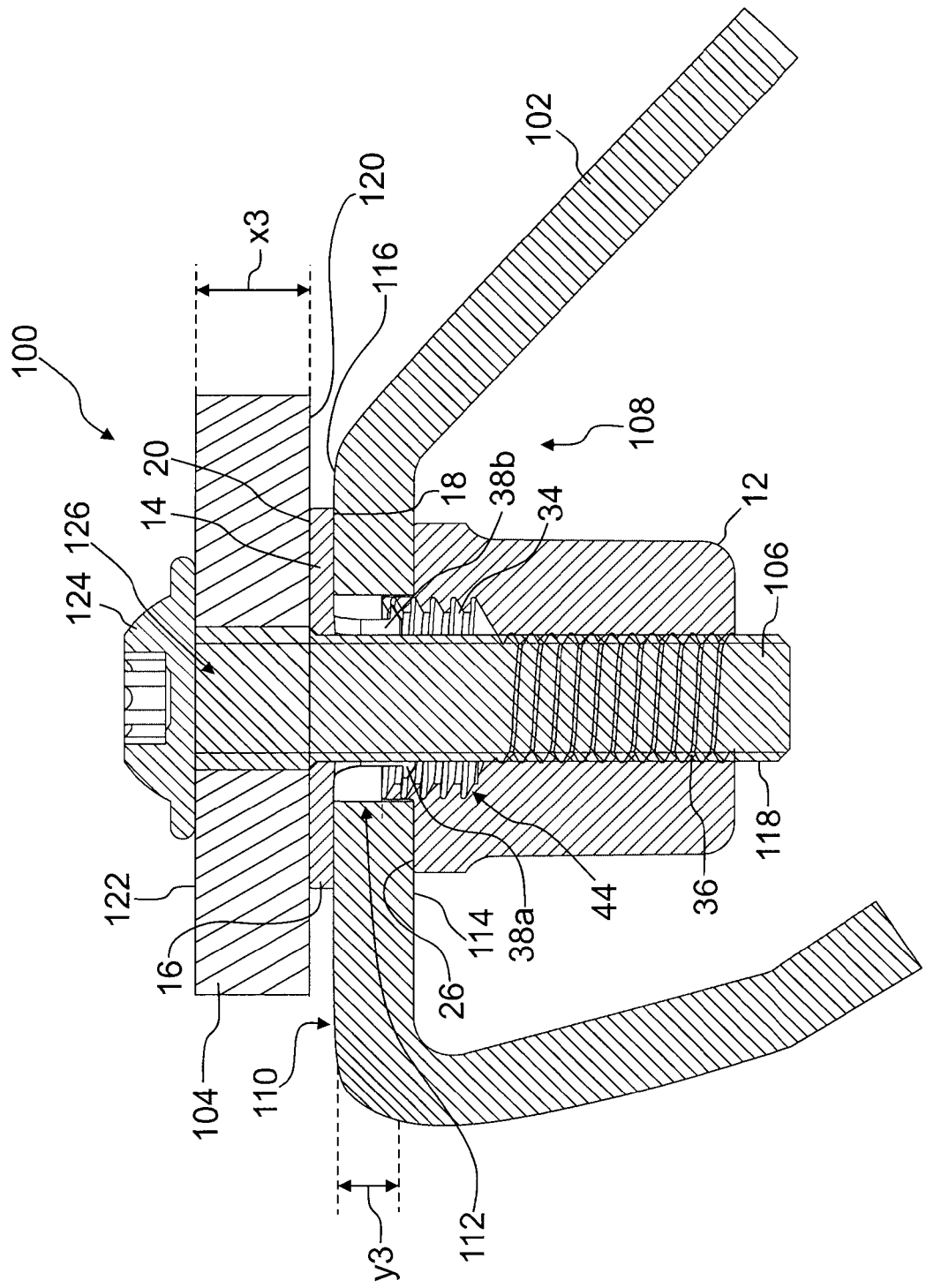
FIG. 13 shows a further embodiment of the assembly according to the invention in a sectional view.

FIGS. 11 to 13 each show an assembly 100 with a first thin-walled component 102, a second thin-walled component 104, an attachment unit 10, and an attachment element 106.

Attachment element 106 is formed as a screw and comprises a screw head 124 and an external thread 118. Screw head 124 rests on contact surface 122 of second component 104. Attachment element 106 extends through a recess 126 in second component 104 as well as through a recess 112 in first component 102.

Attachment unit 10 provides on first component 102 a mounting thread 36 that is formed as an internal thread into which outer thread 118 of attachment element 106 is screwed, so that first component 102 and second component 104 are attached to each other by way of attachment unit 10 and attachment element 106.

Attachment element 106 is adapted to prevent connecting parts 38a-38d formed as elastically deformable webs 38a-38d from loosening from holding portion 44 of attachment body 12 already prior to being screwed in and while being screwed into mounting thread 36. This is achieved in that attachment element 106 already prior to being screwed in and while being screwed into mounting thread 36 demands an installation space which the connecting parts formed as elastically deformable webs 38a-38d would need in order to deform in such a way that the engagement with a fixation thread 34 arranged in holding portion 44 can be released. First components 102 and second components 104 shown in FIGS. 11 to 13 each have different sheet metal thicknesses x1-x3, y1-y3, where inserted attachment units 10 match. The illustrations show that attachment unit 10 according to the invention, due to the use of a thread, namely fixation thread 34, for locking connecting parts 38a-38d formed as engagement hooks, allows components with different material thicknesses to be attached to each other in a manner not damaging the paint.

The following is further to be noted regarding the design of the outer contour of attachment body 12:

In the previously described embodiments, attachment body 12 is formed to be circular at its free end region. However, it is also possible to design the outer contour of attachment body 12 to be multangular, for example rectangular or hexagonal. Due to this configuration, for example, a corresponding socket key can be placed onto the hexagonal outer contour of attachment body 12. For example, mounting attachment unit 10 with attachment body 12 is then possible in locations that are not readily accessible. Attachment of the 10 [sic] with attachment body 12 can then be mounted on a pipe wall in which appropriately designed breakthroughs are arranged.

LIST OF REFERENCE NUMERALS 10 attachment unit
12 attachment body
14 holding element
16 contact portion
18 contact surface
20 contact surface
22 antirotation lock
24 longitudinal axis
26 contact surface
28 material projection
30a-30d corners
32 base body
34 fixation thread
36 mounting thread
38a-38d connecting parts
40a-40d recesses
42a-42d contact regions
44 holding portion
100 assembly
102 component
104 component
106 attachment element
108 first side
110 second side
112 recess
114 contact surface
116 contact surface
118 external thread
120 contact surface
122 contact surface
124 head
126 recess
200 distribution device
202 storage container
204a, 204b storage regions
206a, 206b dosing devices
208a, 208b centrifugal disks
d1, d2 thread diameter
x1-x3 sheet metal thicknesses
y1-y3 sheet metal thicknesses

The invention claimed is:

1. Attachment unit for a mounting thread formed as an internal thread on a component, comprising:
an attachment body that bears said mounting thread and is adapted to be arranged on a first side of said component in a region of a recess extending through said component;
a holding element that is adapted to be arranged on a second side of said component in the region of said recess extending through said component and disposed opposite to said attachment body so as to hold said attachment body on said first side of said component, wherein said holding element comprises one or several connecting parts for holding said attachment body on said first side of said component and adapted to be connected to a holding portion of said attachment body spaced from said mounting thread, and wherein a connecting part of said holding element is formed as a connecting thread formed as a circumferential and as an external thread, where said holding portion of said attachment body comprises a fixation thread formed as an internal thread corresponding to the connecting thread.

2. The attachment unit according to claim 1, wherein said one or said several connecting parts of said holding element are adapted to be connected to said holding portion of said attachment body in a reversibly detachable and in a non-destructive manner.

3. The attachment unit according to claim 1, wherein said one or said several connecting parts of said holding element are adapted to be connected at least in a positive-fit manner to said holding portion of said attachment body.

4. The attachment unit according to claim 1, wherein said attachment body comprises an antirotation lock which is adapted to extend at least in sections through said recess in said component and due to a positive-fit connection prevent rotation of said attachment body about a longitudinal axis of said attachment body.

5. The attachment unit according to claim 1, wherein said attachment body comprises a contact surface which is adapted to be in contact with a contact surface of said component arranged on said first side of said component.

6. The attachment unit according to claim 1, wherein said holding element comprises a contact portion which is adapted to be used as a washer or spacer between said component and a further component to be attached to said component using said attachment unit.

7. The attachment unit according to claim 6, wherein said contact portion of said holding element comprises a first contact surface which is adapted to be in contact with a contact surface of said component arranged on said second side of the component, or a second contact surface which is adapted to be in contact with another contact surface of said further component to be attached to said component using said attachment unit.

8. The attachment unit according to claim 6, wherein said contact portion is formed to be round or disk-shaped and comprises one or several recesses.

9. The attachment unit according to claim 1, wherein said attachment body or said holding element are each integrally formed.

10. The attachment unit according to claim 1, wherein said attachment body or said holding element are each in part or entirely formed from plastic material.

11. Attachment unit for a mounting thread formed as an internal thread on a component, comprising:
an attachment body that bears said mounting thread and is adapted to be arranged on a first side of said component in a region of a recess extending through said component;
a holding element that is adapted to be arranged on a second side of said component in the region of said recess extending through said component and disposed opposite to said attachment body so as to hold said attachment body on said first side of said component, wherein said holding element comprises one or several connecting parts which for holding said attachment body on said first side of said component and adapted to be connected to a holding portion of said attachment body spaced from said mounting thread, wherein said one or said several connecting parts comprise one or several elastically deformable webs for holding said attachment body on said first side of said component and adapted to be connected subject to elastic deformation to said holding portion of said attachment body that is spaced from said mounting thread, wherein said holding portion of said attachment body comprises one or several engagement edges and said one or said several webs are each formed as an engagement hook, where said one or said several engagement edges and said one or said several engagement hooks for holding said attachment body on said first side of said component are adapted to be locked to each other, and wherein said holding portion of said attachment body comprises a fixation thread formed as an internal thread and said one or said several engagement edges are part of said fixation thread.

12. The attachment unit according to claim 11, wherein said one or said several webs each comprise a contact region which bears a section of an external thread that corresponds to said fixation thread.

13. The attachment unit according to claim 11, wherein said mounting thread and said fixation thread have different diameters.

14. An assembly, comprising:
a first component;
a second component;
an attachment unit which provides a mounting thread formed as an internal thread on said first component; and
an attachment element which comprises an external thread corresponding to said mounting thread,
wherein said first component and said second component are attached to each other by way of said attachment unit and said attachment element, and wherein said attachment unit includes:
an attachment body that bears said mounting thread and is adapted to be arranged on a first side of said first component in the region of a recess extending through said first component;
a holding element that is adapted to be arranged on a second side of said first component in the region of said recess extending through said first component and disposed opposite to said attachment body so as to hold said attachment body on said first side of said component,
wherein said holding element comprises one or several connecting parts for holding said attachment body on said first side of said first component and adapted to be connected to a holding portion of said attachment body spaced from said mounting thread, and
wherein a connecting part of said holding element is formed as a connecting thread formed as a circumferential and as an external thread, where said holding portion of said attachment body comprises a fixation thread formed as an internal thread corresponding to the connecting thread.

15. The assembly according to claim 14, wherein said attachment element is adapted to prevent said one or said several connecting parts from loosening from said holding portion of said attachment body already prior to being screwed in or while being screwed into said mounting thread.

\* \* \* \* \*